United States Patent
Robert et al.

(10) Patent No.: US 9,490,531 B2
(45) Date of Patent: Nov. 8, 2016

(54) ANTENNA FOR AN ELECTRONIC DEVICE IN A TYRE

(75) Inventors: Michel Robert, Clermont-Ferrand (FR); Jay Clifford Sinnet, Greenville, SC (US)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 407 days.

(21) Appl. No.: 13/814,984

(22) PCT Filed: Aug. 10, 2011

(86) PCT No.: PCT/FR2011/501898
§ 371 (c)(1),
(2), (4) Date: Apr. 11, 2013

(87) PCT Pub. No.: WO2012/020202
PCT Pub. Date: Feb. 16, 2012

(65) Prior Publication Data
US 2013/0194157 A1    Aug. 1, 2013

(30) Foreign Application Priority Data
Aug. 11, 2010    (FR) ..................... 10 56569

(51) Int. Cl.
*H01Q 1/32* (2006.01)
*H01Q 1/40* (2006.01)
*H01Q 1/36* (2006.01)

(52) U.S. Cl.
CPC . *H01Q 1/40* (2013.01); *H01Q 1/36* (2013.01)

(58) Field of Classification Search
CPC ........................................... H01Q 1/40
USPC ................. 343/873, 895, 793, 702; 340/442
See application file for complete search history.

(56) References Cited

U.S. PATENT DOCUMENTS

| | | | |
|---|---|---|---|
| 3,772,772 A | 11/1973 | Lehnert | 29/600 |
| 4,001,898 A | 1/1977 | Caveney | 24/16 PB |
| 4,791,241 A | 12/1988 | Ando et al. | 174/125.1 |

(Continued)

FOREIGN PATENT DOCUMENTS

| CN | 1099320 A | 3/1995 |
|---|---|---|
| CN | 1915647 A | 2/2007 |

(Continued)

OTHER PUBLICATIONS

R.D. McCommon et al., The Fatigue and Ultimate Tensile Strengths of Metals between 4•2 and 293° K, Proceedings of the Royal Society of London. Series A, Mathematical and Physical Sciences, vol. 242, No. 1229 (Oct. 29, 1957), pp. 203-211.*

(Continued)

*Primary Examiner* — Huedung Mancuso
(74) *Attorney, Agent, or Firm* — Fitzpatrick, Cella, Harper & Scinto

(57) ABSTRACT

An antenna includes a core and is intended to be integrated into a rubber compound for a tire. The antenna further includes an electromagnetic-signal conduction layer, which is made of copper and coats the core, and a chemical isolation layer, which coats the conduction layer and is intended to chemically isolate the rubber compound from an object coated by the isolation layer.

24 Claims, 3 Drawing Sheets

(56) References Cited

U.S. PATENT DOCUMENTS

| | | | |
|---|---|---|---|
| 4,791,242 A | 12/1988 | Gatti | 174/40 R |
| 5,836,066 A | 11/1998 | Ingram | 29/90.7 |
| 5,861,577 A | 1/1999 | Tamura et al. | 174/50.56 |
| 6,147,660 A | 11/2000 | Elliott | 343/895 |
| 6,217,683 B1* | 4/2001 | Balzer et al. | 156/60 |
| 6,257,289 B1* | 7/2001 | Tomita et al. | 152/152.1 |
| 6,449,841 B1 | 9/2002 | Endo et al. | 29/861 |
| 6,452,569 B1 | 9/2002 | Park et al. | 343/895 |
| 6,788,192 B2* | 9/2004 | Shimura | 340/447 |
| 7,375,699 B2* | 5/2008 | Forster et al. | 343/806 |
| 7,623,034 B2* | 11/2009 | Ferguson et al. | 340/572.1 |
| 8,226,783 B2* | 7/2012 | Shimura | 156/60 |
| 8,776,590 B2* | 7/2014 | Kempf et al. | 73/146.5 |
| 2001/0056232 A1 | 12/2001 | Lardo et al. | 600/423 |
| 2002/0029626 A1* | 3/2002 | Koch et al. | 73/120 |
| 2003/0221766 A1 | 12/2003 | Strache et al. | 156/123 |
| 2004/0032377 A1 | 2/2004 | Forster et al. | 343/895 |
| 2004/0252072 A1 | 12/2004 | Adamson et al. | 343/873 |
| 2007/0241987 A1* | 10/2007 | Kish | H01Q 1/2241 343/897 |
| 2008/0142150 A1 | 6/2008 | Robert | 156/117 |
| 2009/0277559 A1 | 11/2009 | Kuriya | 152/548 |
| 2012/0305151 A1 | 12/2012 | Robert | 152/152.1 |

FOREIGN PATENT DOCUMENTS

| | | |
|---|---|---|
| CN | 201532644 U | 7/2010 |
| EP | 0 608 466 A1 | 8/1994 |
| EP | 1 454 770 A1 | 9/2004 |
| EP | 1 942 445 A1 | 7/2008 |
| JP | 4-179003 A | 6/1992 |
| JP | 11-042915 A | 2/1999 |
| JP | 2006-507967 A | 3/2006 |
| WO | WO 03/105511 A1 | 12/2003 |
| WO | WO 2006/059579 A1 | 6/2006 |

OTHER PUBLICATIONS

Notification of First Office Action for Chinese Application No. 201180038530.X, which was issued by SIPO on Feb. 27, 2015 (with English translation of the comments attached).

JPO Coomunication dated Mar. 9, 2016, in connection with counterpart Japanese Application No. 2013-523655.

* cited by examiner

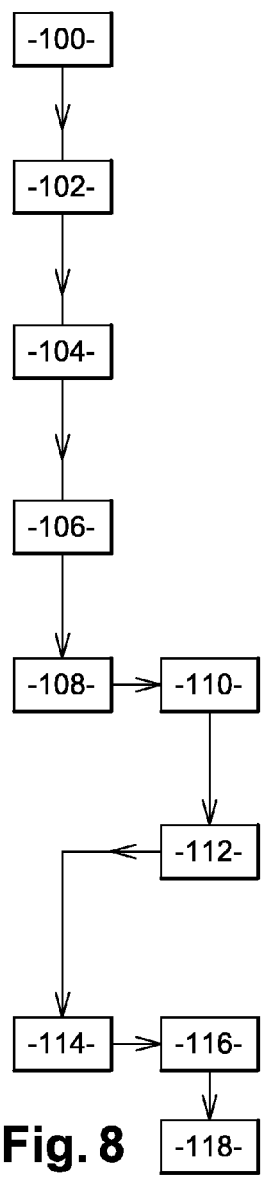
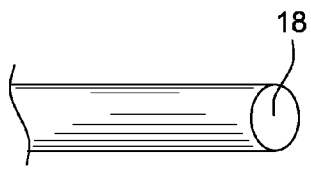
Fig. 3
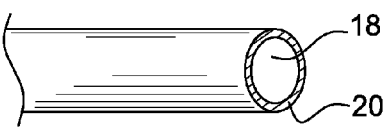
Fig. 4
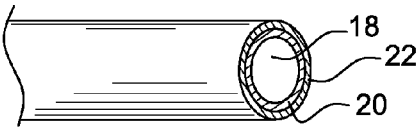
Fig. 5
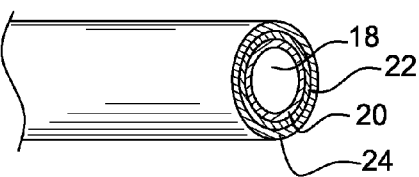
Fig. 6
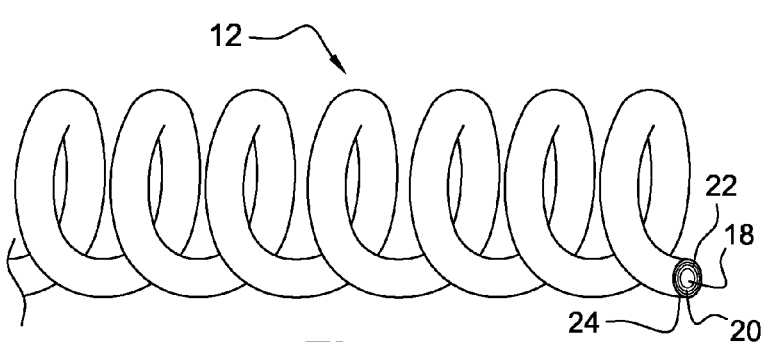
Fig. 7
Fig. 8

ANTENNA FOR AN ELECTRONIC DEVICE IN A TYRE

FIELD OF THE INVENTION

The invention relates to the field of electronic devices for tyres.

BACKGROUND

An electronic device comprising two antennas connected to an electronic member, for example a chip, said electronic member being mounted on a support plate, is known from the prior art. Each antenna has a substantially helical shape. Each antenna comprises a steel core coated directly with a brass coating, brass being an alloy of copper and zinc in respective proportions of around 75% and 25%.

It is known that the electromagnetic conduction for such an antenna takes place mainly through the skin effect, that is to say electromagnetic conduction takes place mainly in the outer layers of the antenna. The skin depth depends especially on the frequency of the radiation and of the constituent material of the conduction layer. To give an example, for a UHF frequency (for example 915 MHz), the skin depth is 2.1 µm for silver, 2.2 µm for copper and 4.4 µm for brass.

To manufacture the antenna, a bare filiform core unwound from a storage reel is formed by plastically deforming it so as to give it a helical shape. The bare helical core is then coated with the brass coating. The coating step is carried out in an electrolysis bath.

As recalled above, for optimum operation of a brass-coated antenna at UHF frequencies, the thickness of the coating layer must not be less than 4 microns. Furthermore, because of the helical geometry of the core, the conditions for coating it are very difficult to control, especially inside the turns. Moreover, since it is made of an alloy, its precise composition is difficult to control and requires precise regulation of the parameters of the deposition process (currents, time through the bath, composition of the bath). To summarize, the quality of the deposit, together with the necessary thicknesses, results in a relatively long deposition time which has a major consequence on the cost aspect of the product.

BRIEF DESCRIPTION OF THE INVENTION

The object of the invention is to provide an industrially robust and lower-cost process enabling an antenna having optimum characteristics to be obtained.

To meet this objective, one subject of the invention is an antenna comprising a core, the antenna being intended to be integrated into a rubber compound, especially for a tyre, comprising:
- an electromagnetic-signal conduction layer made of copper coating the core; and
- a chemical isolation layer coating the conduction layer, intended to chemically isolate the rubber from what the isolation layer coats and made of a different material from the material constituting the conduction layer.

The use of layers having two separate functions, namely a conduction function and a chemical isolation function, makes it possible, on the one hand, to choose materials suitable for each of the functions separately depending on their characteristics and, on the other hand, to optimize the thicknesses of the layers and the process parameters specific to the deposition of each layer (current, time through the bath or run speed, composition of the bath) and also to reduce the costs associated with coating the core.

The conduction layer serves, through the skin effect, to conduct an electromagnetic signal between the antenna and the electronic member connected thereto. The conduction layer is made of copper that may react with the rubber of the tyre. Direct contact between the two would cause both deterioration in the conduction layer and eventually loss of the electronic function and degradation of the rubber surrounding the antenna. The chemical isolation layer is chemically inert with respect to the rubber. The chemical isolation layer thus makes it possible to prevent chemical reactions between the conduction layer and the surrounding rubber. In particular, the conduction layer being made of copper, the chemical isolation layer acts as a barrier to the migration of chemical species from the adjacent rubber compound, for example it prevents sulphidation of the copper.

A substantially pure metal is a metal comprising said metal in a proportion greater than 95%, the at most remaining 5% merely constituting impurities associated with the process for manufacturing the metal or alloy.

It is to be quoted that the efficiency of a metal deposition step is much higher for a substantially pure metal such as copper than for a metal alloy such as brass.

According to certain optional features of the antenna:
- the core is made of steel;
- the conduction layer coats the core directly. As a variant, the bare core may be coated with one or more intermediate layers interposed between the bare core and the conduction layer. In another variant, the bare core may be coated with several conduction layers, each conduction layer being made of copper. In this other variant, one of the conduction layers may coat the core directly, or else an intermediate layer is interposed between the bare core and this conduction layer;
- the chemical isolation layer is made of a substantially pure metal or an alloy of metals, for example chosen from zinc, nickel, tin and brass. The efficiency of the coating step is much higher when a substantially pure metal is used. Furthermore, these metals or brass are chemically inert with respect to the rubber and provide good adhesion of the chemical isolation layer to the conduction layer. Furthermore, in the case of zinc or nickel, they provide good adhesion of the chemical isolation layer to the rubber. Moreover, these metals or brass make it possible for the antenna to be easily connected to the electronic member, for example a chip, thanks to their solderability properties; an alloy of metals is usually made for its greater part of at least two different metals, that is to say constituting together more than 50% in weight of the alloy, and additives providing the alloy with specific properties according to its use;
- the chemical isolation layer coats the conduction layer directly. As a variant, the conduction layer may be coated with one or more intermediate layers interposed between the conduction layer and the chemical isolation layer. In another variant, the conduction layer may be coated with several chemical isolation layers, each chemical isolation layer being made of a substantially pure metal or an alloy of metals, for example chosen from zinc, nickel, tin and brass. In this other variant, one of the chemical isolation layers may coat the conduction layer directly or else an intermediate layer is interposed between the conduction layer and this chemical isolation layer;

the total thickness of the conduction layer is greater than 2 microns, preferably between 4 and 5 microns. If the antenna comprises several conduction layers, the total thickness is the sum of the thicknesses of each conduction layer;

the total thickness of the chemical isolation layer is greater than 0.2 microns, preferably between 0.4 and 0.6 microns. If the antenna comprises several chemical isolation layers, the total thickness is the sum of the thicknesses of each chemical isolation layer;

the antenna includes an external adhesion layer for the antenna to adhere to the rubber coating the chemical isolation layer. As its name indicates, this adhesion layer ensures lasting intimate contact between the adjacent rubber compound and the antenna after a step of crosslinking the rubber compound;

the external adhesion layer coats the chemical isolation layer directly. As a variant, the chemical isolation layer may be coated with one or more intermediate layers interposed between the chemical isolation layer and the adhesion layer. In another variant, the chemical isolation layer may be coated with several adhesion layers, each adhesion layer being made of at least one substantially pure metal, for example chosen from zinc and nickel, or made of an alloy of metals, for example brass, or comprising a non-metallic adhesive. According to this other variant, one of the adhesion layers may coat the chemical isolation layer directly, or else an intermediate layer is interposed between the chemical isolation layer and this adhesion layer;

in one embodiment, the external adhesion layer comprises a non-metallic adhesive;

in another embodiment, the external adhesion layer is made of a substantially pure metal or an alloy of metals, for example chosen from zinc, nickel and brass. These metals enable the antenna to adhere to the surrounding rubber; and the antenna includes at least one helical portion. The antenna is preferably intended to be integrated into a tyre. During operation of the tyre, the latter is subjected to stresses and deformations that are transmitted to the antenna. The helical shape makes it possible to improve the endurance of the antenna with respect to the stresses undergone by the antenna. This is because a helical shape gives the antenna flexibility enabling it to deform without risk of fracturing, which on the one hand would make the electronic function inoperative and, on the other hand, would run the risk of damaging the tyre. Preferably, the outside diameter of the helical portion is 1.2 mm and the pitch of the helical portion is 13 turns per centimeter.

Another subject of the invention is an electronic device comprising an electronic member and at least one antenna connected to the electronic member, the antenna being as defined above.

The invention also relates to a tyre comprising an antenna as defined above or an electronic device as defined above.

Finally, the invention relates to a process for manufacturing an antenna comprising a core, the antenna being intended to be integrated into a rubber compound, wherein:
the core is coated with an electromagnetic-signal conduction layer; and
the conduction layer is coated with a chemical isolation layer intended for chemically isolating the rubber from what the chemical isolation layer coats and made of a different material from the material constituting the conduction layer.

According to certain optional features of the process:

In one method of implementation, the core having a filiform shape is coated with the conduction layer and the chemical isolation layer and, after the coating steps, at least one portion of the coated core is plastically deformed. By coating the core before its plastic deformation, that is to say when the core still has a filiform shape, the efficiency of the coating steps is improved. This is because, since the core has a filiform shape, each coating may cover the core of the antenna uniformly and homogeneously. Thus, each coating step is relatively rapid, thereby enabling the thickness of each layer to be limited and the energy costs of each coating step to be reduced, while still improving the quality of the coating. The antenna thus obtained is therefore functional.

Furthermore, the process is continuous, that is to say the coating step makes it possible to cover a great length of filiform core which will then be cut to length. Thus, unlike a batch production, the process according to the invention makes it possible to ensure constant quality of the product and to reduce manual intervention and therefore costs.

In another method of implementation, at least one portion of the core is plastically deformed and, after the deformation step, the core is coated with the conduction layer and the chemical isolation layer.

BRIEF DESCRIPTION OF THE DRAWINGS

The invention will be better understood on reading the following description, given solely by way of non-limiting example and in conjunction with the drawings in which:

FIGS. 3 to 6 are perspective views with a cross section of the antenna of FIG. 2 during various steps of the manufacturing process according to the first method of implementing the invention;

FIG. 7 is a view similar to that of FIG. 2 during a process step following that of FIGS. 3 to 6;

FIG. 8 is a diagram illustrating various steps of the process according to the first method of implementing the invention;

DETAILED DESCRIPTION OF THE INVENTION

Figure 1:
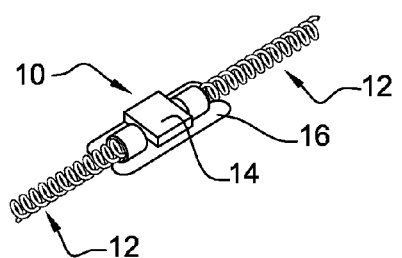
FIG. 1 is a perspective view of an electronic device comprising an antenna manufactured according to a first embodiment of the invention.
Figure 2:
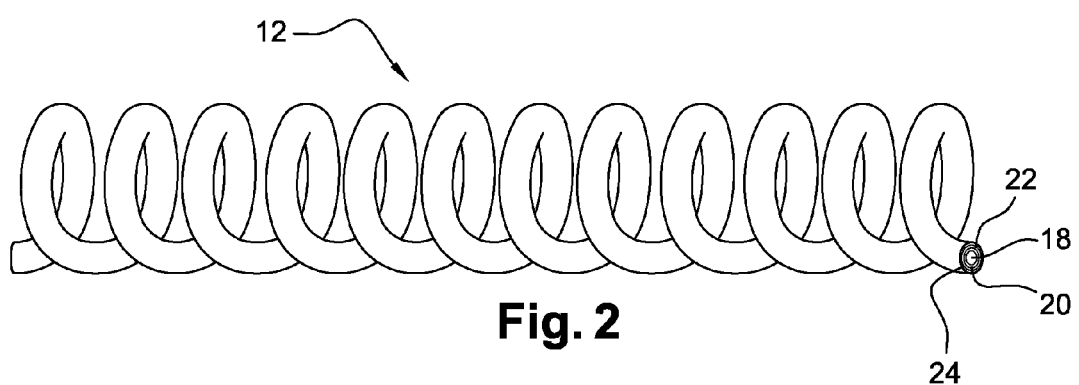
FIG. 2 is a detailed view of the antenna of FIG. 1.

FIG. 1 shows an electronic device denoted by the general reference 10 and intended to be embedded in rubber. In the example shown, the electronic device 10 is of the RFID type and comprises two antennas 12 according to a first embodiment. The antennas 12 are connected to a terminal of an electronic member 14, here a chip, said electronic member being mounted on a support plate 16. In what follows, since the two antennas 12 are identical, only one antenna 12 will be described with reference to FIG. 2. The two antennas 12 together form a dipole antenna.

The antenna 12 has a substantially helical shape and a length, an outside diameter and a helix pitch that are defined according to the conditions under which the electronic device is used. To give an example, the pitch of the helix may be 13 turns per centimeter, the outside diameter may be 1.2 mm and the length may be around 25 mm. This combination of characteristics is particularly useful in the case of the electronic device operating in a tyre at UHF frequencies.

The antenna 12 comprises a steel core 18 having an outside diameter of 203 microns±5 microns. The antenna 12 also includes a first, conduction layer 20 coating the core 18 directly. The conduction layer 20 is made of a substantially pure metal, in the present case metallic copper (chosen for its electrical characteristics and its cost) and is in contact with the core 18. The layer 20 has a thickness of greater than 2 microns, preferably between 4 and 5 microns.

The antenna 12 also includes a second, chemical isolation layer 22 coating the first layer 20 directly. The layer 22 is made of substantially pure metal, in this case metallic zinc, and is in contact with the first layer 20. The layer 22 has a thickness of greater than 0.2 microns, preferably between 0.4 and 0.6 microns.

As a variant, the layer 22 is made of nickel or tin.

In another variant, the layer 22 is made of an alloy of metals, for example brass.

In other variants, the antenna 12 comprises several chemical isolation layers 22, each layer being made of a different substantially pure metal or an alloy of metals.

The antenna 12 also includes a third, adhesion layer 24 coating the second layer 22 directly. The layer 24 comprises a non-metallic adhesive, in this case an adhesive sold under the brand name "Chemlok" or the brand name "Chemosil" by LORD CORPORATION, and is in contact with the second layer 22.

As a variant, the third layer is made of a substantially pure metal or an alloy of metals, for example chosen from zinc, nickel and brass.

The various steps of the process for manufacturing the antenna 12 according to the first embodiment by the first method of implementation will now be described with reference to FIGS. 3 to 8.

The process starts by a filiform metal wire comprising the core 18 being wound onto a reel. This bare filiform core 18 is shown in FIG. 3.

During a first cleaning step 100, the core 18 is made to pass through an alkaline bath.

During a step 102, the core 18 is coated directly with the first conduction layer 20 by continuous electrode deposition. The wire is run through a cyanide bath for copper deposition. This results in the core 18 coated with the layer 20 as shown in FIG. 4.

Next, during a step 104, the first layer 20 is coated directly with the second, chemical isolation layer 22, again by passage through an electrolysis bath of composition appropriate to the material of the chemical isolation layer. This results in the core 18 coated with the layers 20, 22, as shown in FIG. 5.

Next, during a step 106, the second layer 22 is coated directly with the third, adhesion layer 24. This results in the core being coated with the layers 20, 22, 24, as shown in FIG. 6. In the variant in which the third layer is made of a substantially pure metal or an alloy of metals, the third layer is deposited by a "flash" process, which corresponds to a relatively short electro-deposition process enabling a third layer having a thickness of less than 0.1 microns to be obtained. Such a "flash" process uses a high current density and a bath with a low ionic concentration.

Next, during a step 108, the core 18 coated with the layers 20, 22 and 24 is cleaned (removal of the residues from the deposition baths, followed by rinsing) and then dried by passing a stream of hot clean air over it.

In a step 110, the composition of each layer 20, 22, 24 is checked, for example by X-ray fluorescence spectroscopy or by polarography. The thickness of each layer 20, 22, 24 is also checked, for example by scanning electron microscopy, polarography or ICP-AES (inductively coupled plasma—atomic emission spectroscopy). The surface appearance of the antenna 12 is also checked so as to verify the uniformity of the deposit. A test to characterize the mechanical endurance potential of the core and of the adhesion of the coating layers may also be carried out.

Next, during a step 112, the coated filiform core is plastically deformed so as to give it its helical shape by means of a machine suitable for producing such a spring, for example a spring winding lathe. In this case, the core coated with the layers 20, 22 and 24 is continuously deformed plastically over its entire length. What is then obtained is the core coated with the layers 20, 22 and 24, as shown in FIG. 7.

As a variant, only one portion of the core coated with the layers 20, 22 and 24 is plastically deformed periodically along the core coated with the layers 20, 22 and 24.

Next, during a step 114, the coated helical core 18 is cut into sections 24 of predetermined length, here around 20 to 30 millimeters.

Next, during a step 116, the antenna 12 is heat-treated by heating it at a temperature of at least 200° C. for 30 minutes in order to relax the mechanical stresses. What is then obtained is the helical antenna 12 shown in FIG. 2.

Finally, during a step 118, the antenna 12 is connected to a terminal of the electronic member 14 and to the support plate 16 in order to obtain the device 10 shown in FIG. 1.

FIGS. 9 to 14 illustrate an antenna according to a second embodiment of the invention and a process according to a second method of implementing the invention. The elements similar to those of the antenna and the process of the previous embodiments and methods of implementation are denoted by identical references.

Figure 9:
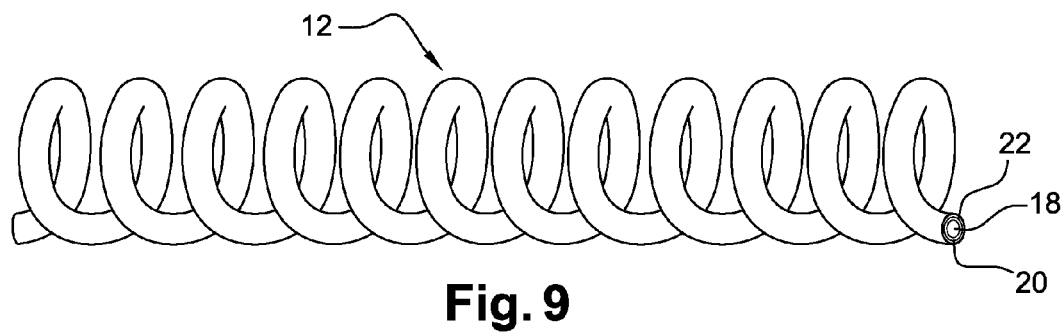
FIG. 9 is a view similar to FIG. 2, showing an antenna according to a second embodiment of the invention.

As previously and as shown in FIG. 9, the antenna 12 comprises a conduction layer 20 coating the core 18 directly. The conduction layer 20 is made of a substantially pure metal, in this case metallic copper.

The antenna 12 also includes a chemical isolation layer 22 coating the conduction layer 20 directly. The chemical isolation layer 22 is made of an alloy of metals, in this case brass.

The various steps of the manufacturing process according to the second embodiment of the antenna will now be described with reference to FIGS. 10 to 14.

Figure 10:
FIGS. 10 to 13 are perspective views with a cross section of the antenna of FIG. 9 during various steps of the manufacturing process according to the second method of implementing the invention.
Figure 11:
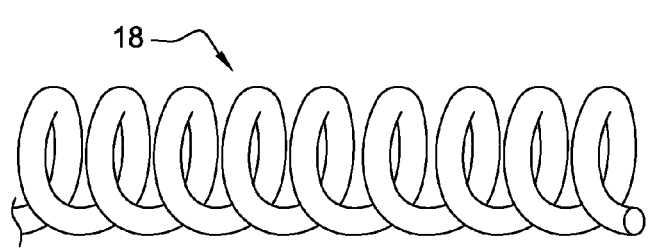

The process starts with a filiform metal wire comprising the core 18 being wound onto a reel. This bare filiform core 18 is shown in FIG. 10.

During a first step 300, the bare filiform core 18 is plastically deformed into its helical shape by means of a spring winding lathe. In this case, the bare filiform core 18 is continuously deformed plastically over its entire length. What is obtained is the helical bare core shown in FIG. 11.

As a variant, only one portion of the bare core 18 is plastically deformed periodically along the bare core 18.

Next, during a step 302 (mechanical stress relaxation step), the bare helical core 18 is heat-treated by heating it at a temperature of at least 200° C. for 30 minutes.

The bare helical core 18 is cleaned in a cleaning step 304, by immersion in cleaning baths, and then dried.

Figure 12:
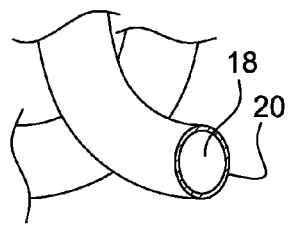

In a step 306, the bare helical core 18 is coated directly with the first, conduction layer 20. What is obtained is the helical core coated with the conduction layer 20, as shown in FIG. 12.

Figure 13:
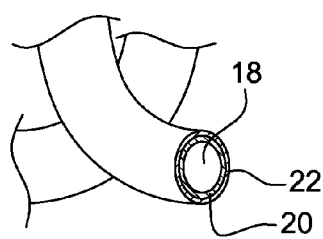
Figure 14:
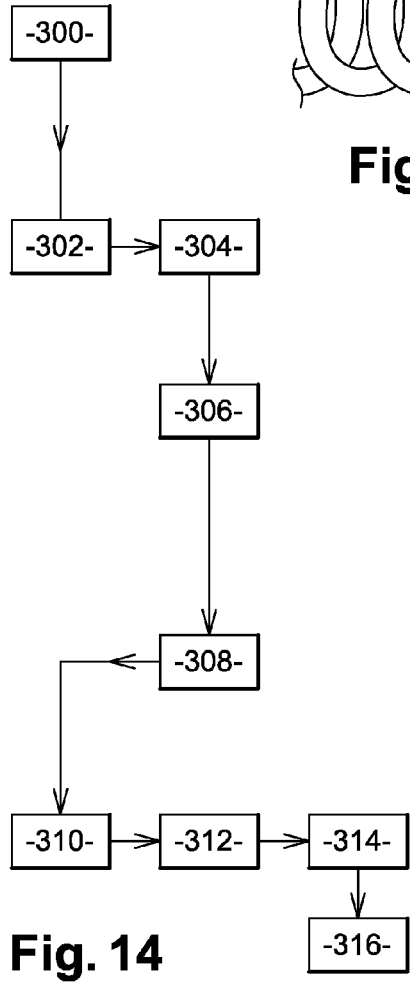
FIG. 14 is a diagram illustrating various steps of the process according to the second method of implementing the invention.

Next, during a step 308, the first layer 20 is coated directly with the second, chemical isolation layer 22. What is obtained is the helical core coated with the conduction layer 20 and the chemical isolation layer 22, as shown in FIG. 13.

Next, during a step 310, a baking step is optionally carried out on the helical core coated with the layers 20, 22 at a temperature of around 200° C. for several hours. This step serves to eliminate the hydrogen dissolved in the core 18 and the layers 20, 22, hydrogen being liable to cause fractures in the antenna 12.

Next, in a step 312, the composition of each layer 20, 22 is checked in a manner similar to the checking step of the first method of implementation.

Next, in a step 314, the coated helical core 18 is cut into sections 24 of predetermined length.

Finally, during a step 316, the antenna 12 is connected to the electronic member 14 and to the support plate 16 in order to obtain a device 10 similar to that shown in FIG. 1.

The invention is not limited to the embodiment or the method of implementation described above.

This is because it would be possible to deform the coated core in its entirety or else only a portion thereof. Furthermore, several portions of the coated core could be plastically deformed in different ways.

The coating steps using metals or alloys are generally carried out in electrolysis baths. As a variant, they could be carried out using other known techniques.

The invention claimed is:

1. An antenna intended to be integrated into a rubber compound, the antenna comprising:
   a core;
   an electromagnetic-signal conduction layer conduction layer made of substantially pure copper and coating the core;
   a chemical isolation layer coating the conduction layer; and
   an external adhesion layer that promotes adhesion of the antenna to the rubber compound, the adhesion layer coating the isolation layer,
   wherein the isolation layer chemically isolates the rubber compound from an object coated by the isolation layer, and
   wherein the isolation layer is made of a different material from a material constituting the conduction layer.

2. The antenna according to claim 1, wherein the core is made of steel.

3. The antenna according to claim 1, wherein the conduction layer coats the core directly.

4. The antenna according to claim 1, wherein the isolation layer coats the conduction layer directly.

5. The antenna according to claim 1, wherein the isolation layer is made of a substantially pure metal or a metal alloy chosen from: zinc, nickel, tin, and brass.

6. The antenna according to claim 1, wherein a total thickness of the conduction layer is greater than 2 microns.

7. The antenna according to claim 1, wherein a total thickness of the conduction layer is between 4 and 5 microns.

8. The antenna according to claim 1, wherein a total thickness of the isolation layer is greater than 0.2 microns.

9. The antenna according to claim 1, wherein a total thickness of the isolation layer is between 0.4 and 0.6 microns.

10. The antenna according to claim 1, wherein the external adhesion layer coats the isolation layer directly.

11. The antenna according to claim 1, wherein the external adhesion layer includes a non-metallic adhesive.

12. The antenna according to claim 1, wherein the external adhesion layer is made of a substantially pure metal or a metal alloy chosen from: zinc, nickel, and brass.

13. The antenna according to claim 1, further comprising a helical portion.

14. The antenna according to claim 13, wherein
   an outside diameter of the helical portion is 1.2 mm, and
   a pitch of the helical portion is 13 turns per centimeter.

15. The antenna according to claim 1, further comprising an intermediate layer interposed between the core and the conduction layer.

16. The antenna according to claim 1, wherein the isolation layer is one of a plurality of chemical isolation layers of the antenna, each isolation layer being made of a metal.

17. An electronic device comprising:
   an electronic member; and
   at least one antenna connected to the electronic member, each of the at least one antenna including:
      a core,
      an electromagnetic-signal conduction layer made of substantially pure copper and coating the core,
      a chemical isolation layer coating the conduction layer, and
      an external adhesion layer that promotes adhesion of the antenna to the rubber compound, the adhesion layer coating the isolation layer,
   wherein the isolation layer chemically isolates a rubber compound from at least one object coated by the isolation layer, and
   wherein the isolation layer is made of a different material from a material constituting the conduction layer.

18. The electronic device according to claim 17, wherein the electronic device is incorporated in a tyre.

19. A process for manufacturing an antenna that includes a core, the antenna being intended to be integrated into a rubber compound, the process comprising:
   coating the core with an electromagnetic-signal conduction layer made of substantially pure copper;
   coating the conduction layer with a chemical isolation layer that chemically isolates the rubber compound from an object coated by the isolation layer, wherein the isolation layer is made of a different material from a material constituting the conduction layer; and
   coating the isolation layer with an external adhesion layer that promotes adhesion of the antenna to the rubber compound.

20. The process according to claim 19,
   wherein the core has a filiform shape and is coated with the conduction layer and the isolation layer, and
   wherein the process further comprises, after the coating by the conduction layer and the coating by the isolation layer, plastically deforming at least one portion of the coated core.

21. The process according to claim 19, further comprising plastically deforming at least one portion of the core before the coating by the conduction layer and the coating by the isolation layer.

22. An antenna intended to be integrated into a rubber compound, the antenna comprising:

a core;

a plurality of electromagnetic-signal conduction layers coating the core, each conduction layer being made of substantially pure copper; and a chemical isolation layer coating the conduction layers;

wherein the isolation layer chemically isolates the rubber compound from an object coated by the isolation layer, and wherein the isolation layer is made of a different material from a material constituting any of the conduction layers.

23. The antenna according to claim 22, further comprising an intermediate layer interposed between the core and an innermost one of the conduction layers.

24. The antenna according to claim 22, wherein the isolation layer is one of a plurality of chemical isolation layers of the antenna, each isolation layer being made of a metal.

* * * * *

UNITED STATES PATENT AND TRADEMARK OFFICE
CERTIFICATE OF CORRECTION

PATENT NO.         : 9,490,531 B2
APPLICATION NO.    : 13/814984
DATED              : November 8, 2016
INVENTOR(S)        : Robert et al.

It is certified that error appears in the above-identified patent and that said Letters Patent is hereby corrected as shown below:

On the Title Page

Item [56], OTHER PUBLICATIONS
Delete "Coomunication" and insert --Communication--.

In the Specification

Column 6
Line 44, delete "As previously and" and insert --As previously discussed and--.

In the Claims

Column 7
Lines 39-40, Claim 1 delete "an electromagnetic-signal conduction layer conduction layer" and insert --an electromagnetic-signal conduction layer--.

Signed and Sealed this
Twenty-fifth Day of April, 2017

Michelle K. Lee
*Director of the United States Patent and Trademark Office*